(12) United States Patent
Yang

(10) Patent No.: US 12,480,617 B1
(45) Date of Patent: Nov. 25, 2025

(54) NEGATIVE PRESSURE SUCTION-BASED FIXING DEVICE

(71) Applicant: SHENZHEN LISEN INTELLIGENT CO., LTD., Guangdong (CN)

(72) Inventor: Rufeng Yang, Guangdong (CN)

(73) Assignee: SHENZHEN LISEN INTELLIGENT CO., LTD., Shenzhen (CN)

( * ) Notice: Subject to any disclaimer, the term of this patent is extended or adjusted under 35 U.S.C. 154(b) by 0 days.

(21) Appl. No.: 19/037,210

(22) Filed: Jan. 26, 2025

Related U.S. Application Data

(63) Continuation of application No. PCT/CN2024/095032, filed on May 23, 2024.

(51) Int. Cl.
*F16M 13/02* (2006.01)
*F16B 47/00* (2006.01)
*H02J 7/00* (2006.01)
*H02J 7/35* (2006.01)
*H02S 40/38* (2014.01)

(52) U.S. Cl.
CPC .......... *F16M 13/022* (2013.01); *F16B 47/00* (2013.01); *H02J 7/0029* (2013.01); *H02J 7/35* (2013.01); *H02S 40/38* (2014.12)

(58) Field of Classification Search
CPC ....... F16M 13/022; F16B 47/00; H02S 40/38; H02J 7/0029; H02J 7/35
USPC ...................................................... 248/205.8
See application file for complete search history.

(56) References Cited

U.S. PATENT DOCUMENTS 11,988,242 B2 * 5/2024 Zimmerman ........... F16B 47/00
11,988,243 B2 * 5/2024 Gintner .................. A61H 23/02

FOREIGN PATENT DOCUMENTS

| CN | 101654077 A | | 2/2010 |
| CN | 215333330 U | * | 12/2021 |
| CN | 216761642 U | | 6/2022 |

OTHER PUBLICATIONS

International Search Report and Written opinion of PCT Patent Application No. PCT/CN2024/095032 issued on Feb. 7, 2025.

* cited by examiner

*Primary Examiner* — Todd M Epps

(57) ABSTRACT

Disclosed is a negative pressure suction-based fixing device comprising a housing, a suction and holding member, a negative pressure creating assembly, a solar panel and a battery; wherein, the housing may have an accommodating cavity thereinside; the suction and holding member may be suctioned onto a suction surface; an end of the suction and holding member away from the housing may be provided with a suction cavity that is in communication with the accommodating cavity; the suction cavity may cooperate with the suction surface to form an enclosed space; the negative pressure creating assembly may be configured to generate negative pressure in the accommodating cavity to create negative pressure in the enclosed space; the solar panel may be disposed on the housing. In this way, the negative pressure suction-based fixing device can continuously supply power to the battery through the solar panel.

14 Claims, 6 Drawing Sheets

NEGATIVE PRESSURE SUCTION-BASED FIXING DEVICE

CROSS REFERENCE TO RELATED APPLICATIONS

The present application is a Continuation Application of PCT Application No. PCT/CN2024/095032 filed on May 23, 2024, the contents of which are incorporated herein by reference in their entirety.

TECHNICAL FIELD

The present disclosure relates to suction and holding apparatus, in particular to negative pressure suction-based fixing devices.

BACKGROUND OF THE INVENTION

It is often necessary for drivers to place electronic devices within their sight to view navigation and road conditions during driving. Sometimes, passengers also need to free their hands and fix electronic devices on the vehicle body to watch videos displayed on these devices. Typically, electronic devices may be fixed on the vehicle body by brackets or suction devices. Brackets are often limited by the structure of the vehicle body and can only be installed at designated positions. Suction devices, on the other hand, rely on negative pressure to attach to the vehicle body, allowing them to be attached to more positions on the vehicle body. Compared to the use of brackets, suction devices provide more flexibility in fixing the position of electronic devices.

However, during long periods of driving, the batteries in the suction devices frequently suffer from limited battery life, requiring users to frequently recharge the suction devices using a power source, which brings great inconvenience to users.

SUMMARY OF THE INVENTION

The present disclosure mainly provides negative pressure suction-based fixing devices designed to solve the above problem of insufficient battery life within the devices.

To address the aforementioned technical problem, the present application provides a negative pressure suction-based fixing device, which may comprise a housing, a suction and holding member, a negative pressure creating assembly, a solar panel and a battery. The housing may have an accommodating cavity thereinside. The suction and holding member may be suctioned onto a suction surface, with a suction cavity provided at an end away from the housing that is in communication with the accommodating cavity and cooperates with the suction surface to form an enclosed space. The negative pressure creating assembly may be configured to generate negative pressure in the accommodating cavity to create negative pressure in the enclosed space. The solar panel may be disposed on the housing and configured to convert solar energy into electrical energy, having a light absorbing surface with at least a portion exposed through the housing. The battery may be configured to supply power to the negative pressure creating assembly and be capable of storing the electrical energy converted by the solar panel.

In some embodiments, the housing has a first end face and a second end face that are opposite and facing away from each other along the axial direction of the housing; the suction and holding member is mounted on the first end face of the housing, a first through-hole is arranged on the wall of the suction cavity, and a second through-hole is arranged on the first end face of the housing; the suction cavity is in communication with the accommodating cavity via the first through-hole and the second through-hole; and the solar panel is mounted on the second end face of the housing.

In some embodiments, the second end face is provided with a fitting recess in which the solar panel is mounted, and the light absorbing surface of the solar panel is flush with the second end face.

In some embodiments, the solar panel is rotatably disposed on the second end face, so that it can be lifted and lowered by rotation to adjust the angle of the solar panel.

In some embodiments, the negative pressure suction-based fixing device further includes a magnetic member mounted on the housing and designed to magnetically attract a part to be secured.

In some embodiments, the magnetic member is mounted on a side of the solar panel that is distal to the housing, and exposes at least a portion of the light absorbing surface.

In some embodiments, the magnetic member is ring-shaped or arc-shaped.

In some embodiments, the negative pressure suction-based fixing device further includes a charging interface for connecting with an external power supply to supply power to the battery.

In some embodiments, the negative pressure suction-based fixing device further includes a first charging circuit, a second charging circuit and a comparator. The first charging circuit includes a first switching unit and is configured to connect to the solar panel; and the second charging circuit includes a second switching unit and is configured to connect to an external power supply. The first switching unit has one end connected to the solar panel and another end connected to the battery; and the second switching unit has one end connected to the external power supply and another end connected to the battery. The comparator has a first input end connected to the first charging circuit, a second input end connected to the second charging circuit, and an output end configured to output a comparison result. Both the first switching unit and the second switching unit are responsive to the comparison result of the comparator, switching between the on and off states accordingly.

In some embodiments, the first charging circuit further includes a first protection unit and the second charging circuit further includes a second protection unit. The first protection unit has one end connected to the first switching unit and another end connected to the battery; and the second protection unit has one end connected to the second switching unit and another end connected to the battery. Both the first and second protection units are designed to prevent reverse current.

In some embodiments, the negative pressure creating assembly has a driving element, a cylinder piston and a cylinder barrel. The cylinder barrel defines an interior receiving cavity that is in communicated with the accommodating cavity. The cylinder piston is arranged within the receiving cavity. The driving element is configured to drive the cylinder piston to reciprocate, thereby generating negative pressure within the accommodating cavity.

In some embodiments, the negative pressure suction-based fixing device further includes an activation assembly having a first movable part and a switch part. The first movable part has an end arranged outside the accommodating cavity and another end arranged inside the accommodating cavity. The first movable part is capable of moving towards the inside of the accommodating cavity to actuate the switch part, thereby activating the negative pressure creating assembly.

In some embodiments, the suction cavity of the suction and holding member has a suction port for abutting against the suction surface; the direction of movement of the first movable part is parallel to the axial direction of the suction port; and when the suction and holding member is suctioned onto the suction surface, the first movable part can be abutted against the suction surface to be pressed by the suction surface to move towards the interior of the accommodating cavity.

In some embodiments, the switch part is a bi-directional switch; and the first movable part can also be moved to the outside of the accommodating cavity to actuate the bi-directional switch, thereby initiating the activation of the negative pressure creating assembly.

In some embodiments, the negative pressure suction-based fixing device further includes an air inlet assembly configured to allow the accommodating cavity to be in communication with the exterior of the housing, enabling the suction and holding member to be detached from the suction surface.

In some embodiments, the air inlet assembly includes a second movable part that has one end arranged outside the housing and another end arranged inside the housing. When subjected to pressure, the second movable part can open an air channel between the accommodating cavity and the exterior of the housing.

As previously mentioned, the negative pressure suction-based fixing device provided in this application comprises: a housing provided with an accommodating cavity therein; a suction and holding member suctioned onto a suction surface and having one end away from the housing provided with a suction cavity that is in communication with the accommodating cavity and forms an enclosed space by the cooperation with the suction surface; a negative pressure creating assembly configured to generate negative pressure in the accommodating cavity to create negative pressure in the enclosed space; a solar panel disposed on the housing for converting solar energy into electrical energy and having a light absorbing surface with at least a portion thereof exposed through the housing; and a battery configured to supply power to the negative pressure creating assembly and store the electrical energy converted by the solar panel. In this way, by mounting the solar panel on the housing, the solar panel can convert solar energy into electrical energy and store it into the battery during daytime travel. That is, it can continuously supply power to the battery by the solar panel during daytime, allowing the battery to continuously supply power to the negative pressure creating assembly. This addresses the issue of insufficient battery life in the negative pressure suction-based fixing device, reducing the need for frequent power charging and enhancing user experience. And even when the vehicle is not in use during daytime, the solar panel can also convert solar energy into electrical energy, compensating for the natural depletion of the battery's charge when not in use, so that the battery of the negative pressure suction-based fixing device can also have sufficient power supply at night.

DETAILED DESCRIPTION

The present disclosure is further described in detail below through specific embodiments in combination with the drawings, wherein similar elements across different embodiments adopt associated similar element labels. In the following embodiments, many details are described to facilitate better understanding of the application. However, those skilled in the art can readily recognize that some features can be omitted in different cases or can be replaced by other elements, materials and methods. In some cases, some operations pertinent to this disclosure are not explicitly shown or described in the specification to prevent the core aspects of this disclosure from being obscured by excessive detail, and detailing these operations is not deemed necessary, as those skilled in the art can fully comprehend them based on the specification and the general technical knowledge in the field.

Furthermore, the characteristics, operations or features described in the specification may be combined in any suitable manner to form various embodiments. At the same time, the steps or actions described in the method may be sequenced, adjusted, or rearranged in a manner apparent to those skilled in the art. Therefore, the sequences in the specification and the drawings are merely intended for the clear description of an embodiment and do not necessarily represent a required sequence, unless otherwise specified as a mandatory sequence.

The serial numbers, such as "first", "second", etc., assigned to the parts in this document are only used to distinguish the described objects and do not have any sequential or technical meaning. The terms "connect" and "couple" used in this document, unless specifically stated otherwise, refer to both direct and indirect connections (couplings).

The present disclosure provides a negative pressure suction-based fixing device that can be suctioned onto a suction surface. This device may be provided with a connecting part, allowing a part to be secured to be secured onto the device, thus achieving fixation of the part to be secured on the suction surface. The connection between the connecting part and the part to be secured can include, but is not limited to, buckle connection, magnetic snap connection and interference fit connection. In an exemplary application, the device may be used in a vehicle-mounted environment; where it can be secured on a vehicle body, enabling an electronic device to be fixed onto the device by the connecting part, so that the content displayed by the electronic device can be viewed by users. Of course, the negative pressure suction-based fixing device provided in the present disclosure is not limited to the vehicle-mounted environments, and it can be used in any context that requires fixation of a part to be secured.

Figure 1:
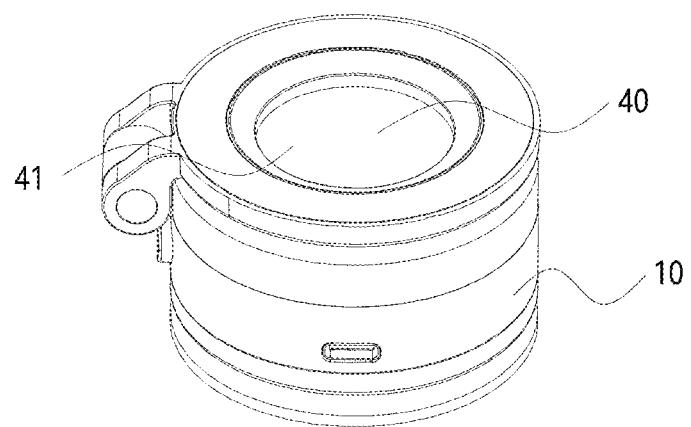
FIG. 1 is a schematic structural diagram of a negative pressure suction-based fixing device in some embodiments of the present disclosure from a perspective.
Figure 2:
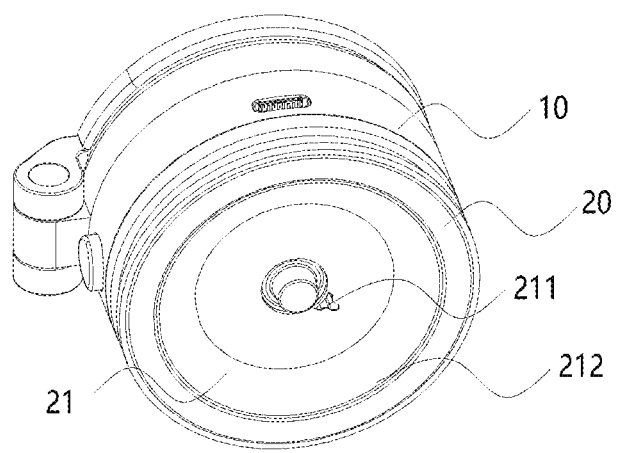
FIG. 2 is a schematic structural diagram of a negative pressure suction-based fixing device in some embodiments of the present disclosure from another perspective.
Figure 3:
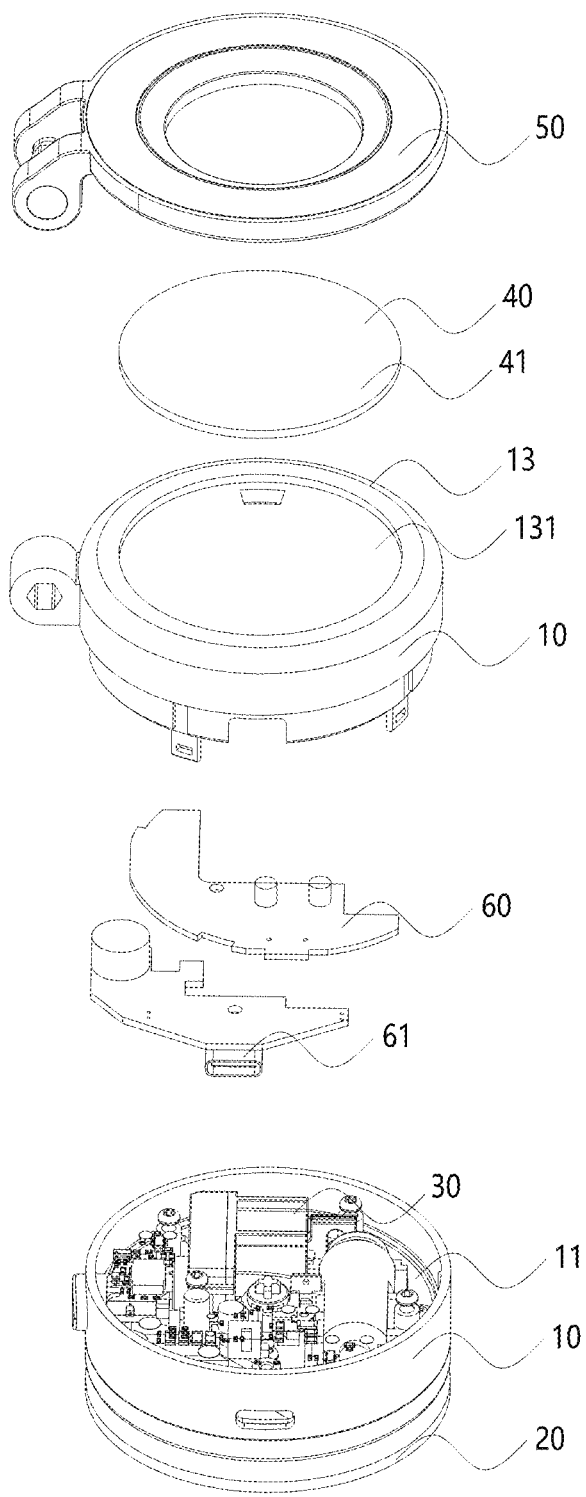
FIG. 3 is a schematic exploded diagram of the structure shown in FIG. 1.

Please refer to FIGS. 1-3. The negative pressure suction-based fixing device may include a housing 10, a suction and holding member 20, a negative pressure creating assembly 30, a solar panel 40 and a battery. The housing 10 may have an accommodating cavity 11 inside. Specially, the housing 10 may include an upper housing and a lower housing. These two housings may be detachably connected and together form the accommodating cavity 11.

The suction and holding member 20 may be designed to be suctioned onto a suction surface. The suction and holding member 20 may be disposed on the housing 10, for instance, on an end face of the housing 10 along its axial direction or on the annular side wall of the housing 10. As shown in FIG. 2, the end of the suction and holding member 20 away from the housing 10 is provided with a suction cavity 21 that is in communication with the accommodating cavity 11; that is, the internal gas pressure in the suction cavity 21 may be the same as that in the accommodating cavity 11. The suction cavity 21 may be designed to form an enclosed space together with the suction surface.

The suction and holding member 20 may be, for example, a suction cup or a suction ring. To ensure a secure fit between the suction and holding member 20 and the suction surface and prevent air leakage in the enclosed space formed by the suction and holding member 20 and the suction surface, the material of the suction and holding member 20 may be made of a flexible material. The flexible material may be deformable, allowing for better attachment of the suction and holding member 20 to the suction surface.

As shown in FIG. 2 and FIG. 3, the negative pressure creating assembly 30 may be designed to generate negative pressure within the accommodating cavity 11. Since the accommodating cavity 11 is in communication with the enclosed space, the negative pressure creating assembly 30 can create negative pressure in the enclosed space, allowing the suction and holding member 20 to generate a suction and holding effect due to negative pressure. The negative pressure creating assembly 30 can be powered on to stably generate negative pressure in the enclosed space, which is more stable and reliable than natural suction methods, such as by squeezing out the air in the enclosed space to make the suction and holding member 20 attach to the suction surface.

As shown in FIG. 1 and FIG. 3, the solar panel 40 may be a component capable of converting solar energy into electrical energy. The solar panel 40 may be disposed on the housing 10 and may have a light absorbing surface 41. At least a portion of the light absorbing surface 41 may be exposed through the housing 10. Preferably, to enhance the energy conversion efficiency of the solar panel 40, the entire light absorbing surface 41 may be exposed through the housing 10, allowing the solar panel 40 to fully harness solar energy. The battery may be configured to supply power to the negative pressure creating assembly 30 and may be capable of storing the electrical energy converted by the solar panel 40.

In accordance with the negative pressure suction-based fixing device presented in this application, by disposing the solar panel 40 on the housing 10, during daytime driving, the solar panel 40 can convert solar energy into electrical energy and store it into the battery; that is, the solar panel 40 can continuously supply power to the battery by the solar panel 40 during daytime, enabling the battery to continuously supply power to the negative pressure creating assembly 30. This improves the battery life of the negative pressure suction-based fixing device, reducing the need for frequent power charging and enhancing user experience. Even when not driving during daytime, the solar panel 40 can convert solar energy into electrical energy, compensating for the natural discharge of the battery during periods of non-use, ensuring that the battery of the negative pressure suction-based fixing device can also have sufficient power supply at night.

Figure 4:
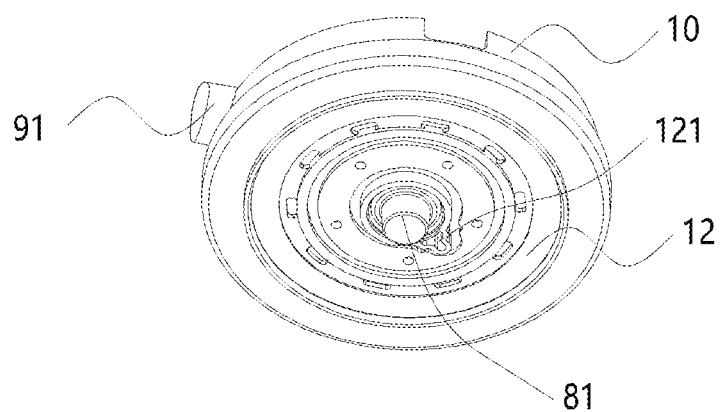
FIG. 4 is a schematic structural diagram of a lower housing in some embodiments of the present disclosure.

As shown in FIG. 3 and FIG. 4, in some embodiments, the housing 10 may have a first end face 12 and a second end face 13 that are opposite and facing away from each other along the axial direction of the housing 10. The suction and holding member 20 may be disposed on the first end face 12 of the housing 10. The wall of the suction cavity 21 may be provided with a first through-hole 211, and the first end face 12 of the housing 10 may be provided with a second through-hole 121. The suction cavity 22 may be in communication with the accommodating cavity 11 via the first through-hole 211 and the second through-hole 121. The solar panel 40 may be disposed on the second end face 13 of the housing 10. Since the suction and holding member 20 is disposed on the first end face 12 of the housing 10, which typically faces the vehicle body, while the second end face 13 of the housing 10 faces the vehicle window, disposing the solar panel 40 on the second end face 13 of the housing 10 is advantageous for the solar panel 40 to absorb solar energy through the window.

In some embodiments, as shown in FIG. 3, the second end face 13 may be provided with a fitting recess 131. The solar panel 40 may be mounted in the fitting recess 131, and the light absorbing surface 41 of the solar panel 40 may be flush with the second end face 13. This design allows for a smoother installation of magnetic components and other parts on one side of the second end face 13 of housing 10 in subsequent steps. Of course, in other embodiments, the light absorbing surface 41 of the solar panel 40 may also be lower or higher than the second end face 13.

In other embodiments, the solar panel 40 may also be rotatably disposed on the second end face 13, so that it can be lifted and lowered relative to the second end face 13 by rotation to adjust the angle of the solar panel 40. The solar panel 40 may form an angle with the second end face 13, allowing users to adjust the angle between the solar panel 40 and the second end face 13 based on the current direction of sunlight, thereby improving the energy utilization efficiency of the solar panel 40.

In some embodiments, the negative pressure suction-based fixing device may also include a connecting wire (not shown in the figure) and a circuit board 60. The circuit board 60, the negative pressure creating assembly 30 and the battery may all arranged inside the accommodating cavity 11 to ensure a streamlined appearance of the negative pressure suction-based fixing device. One end of the connecting wire may be electrically connected to the solar panel 40, and the other end of the connecting wire may be electrically connected to the circuit board 60. The wall of the fitting recess 131 may be provided with a connecting hole to allow the connecting wire to pass through, so that the solar panel 40 on the outside of the housing 10 can be electrically connected to the circuit board 60 in the housing 10.

In some embodiments, the negative pressure suction-based fixing device may also include a magnetic member 50 disposed on the housing 10. Preferably, the magnetic member 50 may be disposed on an end of the housing 10 away from the first end face 12. In some embodiments, the magnetic member 50 may be disposed on the side of the solar panel 40 away from the housing 10 and may expose at least a portion of the light absorbing surface 41. For example, the magnetic member 50 may be designed in an annular or curved shape.

The magnetic member 50 may be configured to magnetically attract a part to be secured. Specifically, in some embodiments, the connecting part may be configured as the magnetic member 50. For instance, in applications involving the securing of electronic equipment, the suction and holding member 20 may be used to be suctioned and supported on the vehicle body, and the magnetic member 50 may be used to magnetically attract the electronic equipment. Of course, the magnetic member 50 may be used to magnetically attract the vehicle body, while the suction and holding member 20 may be used to suction and support the electronic equipment. Generally, the housing of the electronic equipment may be made of metal material which can magnetically attract the magnetic member 50. Alternatively, the interior of the electronic equipment may be provided with a metal or magnetic part that can magnetically attach to the magnetic member 50. In this respect, leveraging the typical characteristics of the electronic equipment enables a liable connection between the negative pressure suction-based fixing device and the electronic equipment.

Additionally, in some embodiments, the negative pressure suction-based fixing device may also include a wireless charging coil that can charge an electronic equipment wirelessly when the magnetic member 50 is magnetically attracted the electronic equipment.

As shown in FIG. 3, in some embodiments, the negative pressure suction-based fixing device may also include a charging interface 61 that is configured to connect to an external power supply to supply power to the battery. Even though the solar panel 40 can be used to charge the battery, the battery storage may be depleted during long periods of travel at night. Therefore, in some embodiments, the negative pressure suction-based fixing device may incorporate two charging modes: charging with the solar panel 40 and charging with the external power supply, enhancing the reliability of the negative pressure suction-based fixing device during nighttime or cloudy/rainy conditions.

Figure 5:
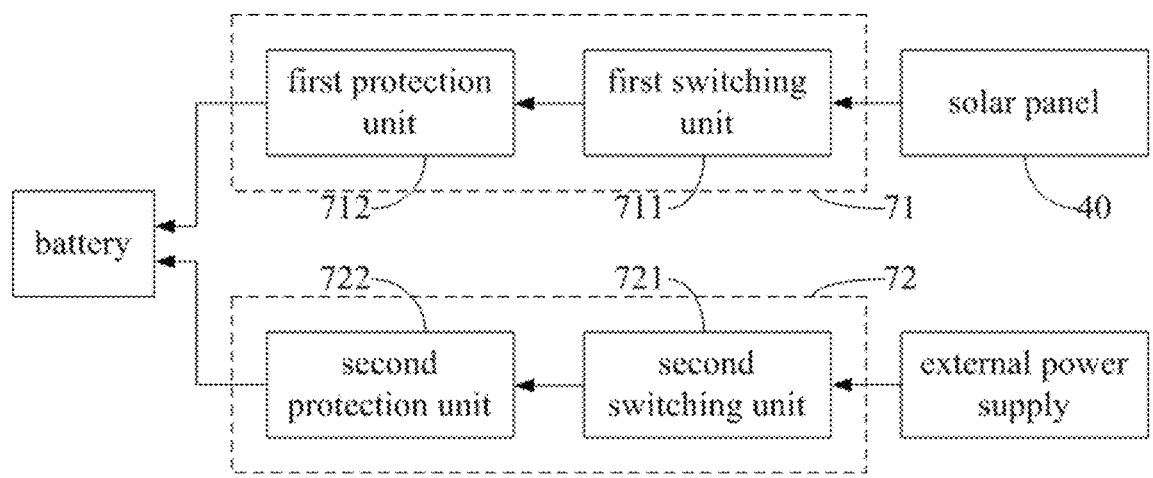
FIG. 5 is a block diagram of a charging circuit of a negative pressure suction-based fixing device in some embodiments of the present disclosure.
Figure 6:
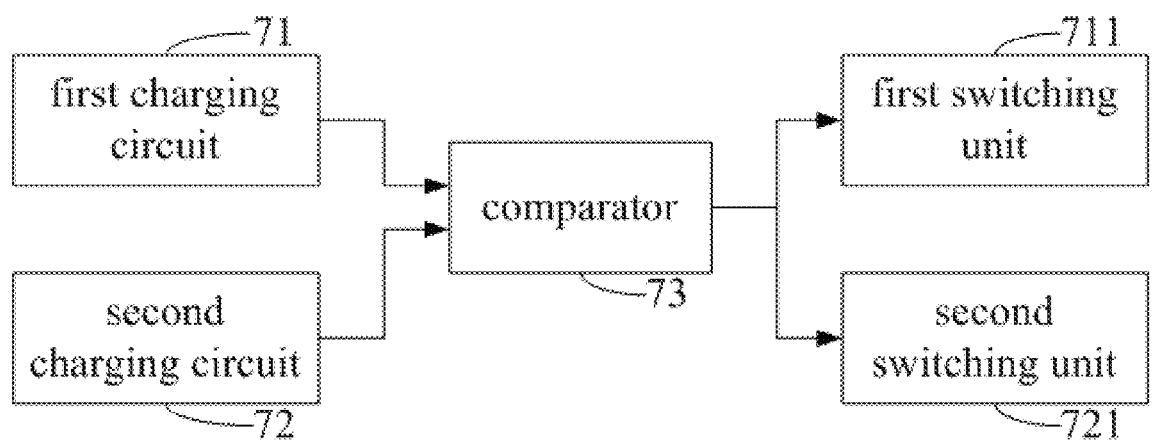
FIG. 6 is a block diagram of a connection structure for a comparator in some embodiments of the present disclosure.

Furthermore, in some embodiments, referring to FIG. 5 and FIG. 6, the negative pressure suction-based fixing device may also include a first charging circuit 71, a second charging circuit 72 and a comparator 73. The first charging circuit 71, which may include a first switching unit 711, may be designed to connect to the solar panel 40. The second charging circuit 72, which may include a second switching unit 721, may be designed to connect to the external power supply.

One end of the first switching unit 711 may be connected to the solar panel 40, and another end of the first switching unit 711 may be connected to the battery. One end of the second switching unit 721 may be connected to the external power supply, and another end of the second switching unit 721 may be connected to the battery. The first input end of the comparator 73 may be connected to the first charging circuit 71, and the second input end of the comparator 73 may be connected to the second charging circuit 72. The output end of the comparator 73 may be configured to output a comparison result that is may be, for example, the comparison of the charging current between the first charging circuit 71 and the second charging circuit 72. The first switching unit 711 may respond to the comparison result from the comparator 73 by switching on or off, and the second switching unit 721 may also respond to the comparison result from the comparator 73 by switching on or off.

For example, when the solar panel 40 charges the battery, if the external power supply is not connected and the first charging circuit 71 is greater than that of the second charging circuit 72, the comparator 73 may output a first comparison result. In response to this, the first switching unit 711 is in the on state and the second switching unit 721 is in the off state. When the external power supply is connected, and the charging current of the second charging circuit 72 is greater than that of the first charging circuit 71, the comparator 73 may output a second comparison result. In response to this, the first switching unit 711 is in the off state and the second switching unit 721 is in the on state. This means that when the external power supply is connected, it can ensure that the second charging circuit 72, powered by the external power supply, is connected, while the first charging circuit 71, powered by the solar panel 40, is disconnected. This prevents both charging modes from operating simultaneously.

Furthermore, in some embodiments, the first charging circuit 71 may also include a first protection unit 712, and the second charging circuit 72 may also include a second protection unit 722. One end of the first protection unit 712 may be connected to the first switching unit 711, and another end of the first protection unit 712 may be connected to the battery. One end of the second protection unit 722 may be connected to the second switching unit 721, and another end of the second protection unit 722 may be connected to the battery. These protection units 712, 722 may be designed to prevent reverse current. The first protection unit 712 and the second protection unit 722 may be, for example, diodes.

Figure 7:
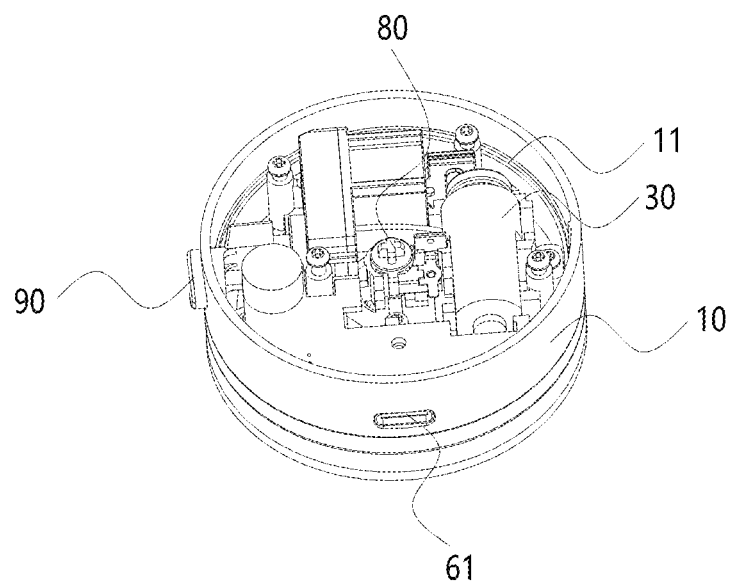
FIG. 7 is a schematic structural diagram of a lower housing, a negative pressure creating assembly, an activation assembly and an air inlet assembly in some embodiments of the present disclosure.
Figure 8:
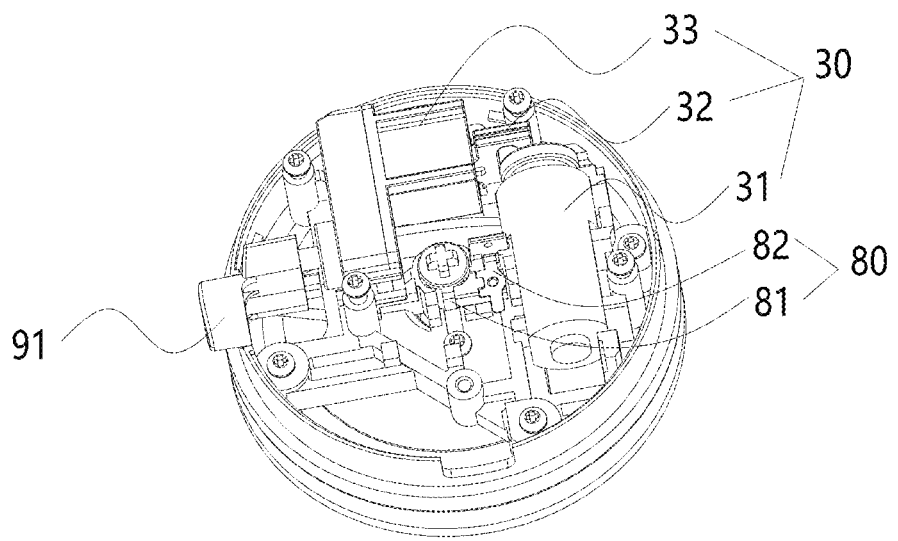
FIG. 8 is a schematic structural diagram of a negative pressure creating assembly, an activation assembly and an air inlet assembly in some embodiments of the present disclosure.
Figure 9:
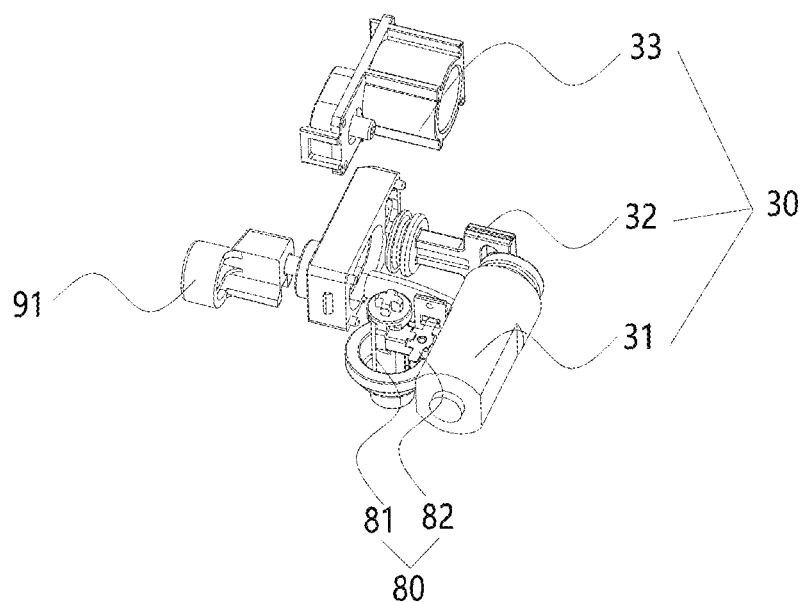
FIG. 9 is a schematic structural diagram of a negative pressure creating assembly (in an exploded view), an activation assembly and an air inlet assembly in some embodiments of the present disclosure.

As shown in FIGS. 7-9, in some embodiments, the negative pressure creating assembly 30 may include a driving element 31, a cylinder piston 32 and a cylinder barrel 33. Inside the cylinder barrel 33, there may be a receiving cavity that is communicated with the accommodating cavity 11 and accommodates the cylinder piston 32. The driving element 31 may be configured to drive the cylinder piston 32 to reciprocate, which generates negative pressure within the accommodating cavity 11. Since the negative pressure creating assembly 30 is driven by the driving element 31, this allows the user to control the operation of the negative pressure creating assembly 30 by controlling the start and stop of the driving element 31.

The driving element 31 may be a motor. The output shaft of the motor may drive the cylinder piston 32 to move by a transmission mechanism, for example, driving the cylinder piston 32 to reciprocate by a crank mechanism.

As shown in FIGS. 2, 7-9, in some embodiments, the negative pressure suction-based fixing device may also include an activation assembly 80 that includes a first movable part 81 and a switch part 82. An end of the first movable part 81 may be arranged outside the accommodating cavity 11, and another end of the first movable part 81 may be arranged inside the accommodating cavity 11. The first movable part 81 may be capable of moving towards the interior of the accommodating cavity 11 to actuate the switch part 82 to activate the negative pressure creating assembly 30. This allows the user to operate the first movable part 81 from the exterior of the housing 10 to activate the negative pressure creating assembly 30, facilitating easy operation of the first movable part 81 by the user, and also allowing the user to decide when to perform negative pressure suction.

In some embodiments, the suction cavity 21 of the suction and holding member 20 may be equipped with a suction port 212 designed to abut against the suction surface. The direction of movement of the first movable part 81 may be parallel to the axial direction of the suction port 212. When the suction and holding member 20 is suctioned onto the suction surface, the first movable part 81 can be abutted against the suction surface to be subject to the pressure from the suction surface to move towards the interior of the accommodating cavity 11, thereby activating the negative pressure creating assembly 30. In this way, when the suction and holding member 20 is pressed onto the suction surface by a user, the first movable part 81 can be activated automatically, achieving simultaneous activation of the negative pressure creating assembly 30 and the pressing action by the user. This simplifies the startup of the negative pressure creating assembly 30 without requiring the user to manipulate the first movable part. Preferably, the portion of the first movable part 81 located outside the housing 10 may be disposed within the suction cavity 21 of the suction and holding member 22. Of course, in other embodiments, the portion of the first movable part 81 located outside the housing 10 may also be arranged outside the suction cavity 21.

In some embodiments, the switch part 82 may be a bi-directional switch, and the first movable part 81 may also be capable of moving towards the exterior of the accommodating cavity 11, actuating the bi-directional switch so as to activate the negative pressure creating assembly 30. As the suction and holding member 20 may loosen during suction and support, when it loosens, the negative pressure suction-based fixing device may need to be pressed again, which is troublesome. With the provision of the bi-directional switch, the negative pressure creating assembly 30 may be activated when the first movable part 81 is pressed or released, thereby preventing the loosening of the suction and holding member 20 and allowing the suction and holding member 20 to be more stably suctioned on the suction surface.

As shown in FIGS. 7-9, in some embodiments, the negative pressure suction-based fixing device may also include an air inlet assembly 90 configured to communicate the accommodating cavity 11 with the exterior of the housing 10 to allow the suction and holding member 20 to be separated from the suction surface. With the provision of the air inlet assembly 90, the user can actively and smoothly separate the suction and holding member 20 from the suction surface. For example, the air inlet assembly 90 may include a second movable part 91 and a blocking part. An end of the second movable part 91 may be arranged outside of the housing 10, and another end of the second movable part 91 may be arranged inside the housing 10. The second movable part 91, when subjected to pressure, may enable the blocking part to move to communicate the air channel between the accommodating cavity 11 and the exterior of the housing 10.

In other embodiments, the negative pressure suction-based fixing device can also allow to press a button, which disconnect the circuit of the negative pressure creating assembly 30, causing it stop working, thus enabling the user to remove the suction and holding member 20 from the suction surface.

The present application has been illustrated above with reference to specific embodiments, which are merely provided for the purpose of understanding the present application and are not intended to limit the scope of the present application. For those skilled in the art, it is possible to make certain simple derivations, modifications, or substitutions based on the principles of the present application.

The invention claimed is:

1. A negative pressure suction-based fixing device, comprising:
   a housing having an accommodating cavity thereinside;
   a suction and holding member configured to be suctioned onto a suction surface and having a suction cavity at its end remote from the housing, the suction cavity being in communication with the accommodating cavity and configured to cooperate with the suction surface to form an enclosed space;
   a negative pressure creating assembly configured to generate negative pressure in the accommodating cavity so as to create negative pressure in the enclosed space;
   a solar panel mounted on the housing and configured to convert solar energy into electrical energy, with a light absorbing surface that is at least partially exposed through the housing;
   a battery configured to supply power to the negative pressure creating assembly and be capable of storing the electrical energy converted by the solar panel;
   a charging interface configured to connect with an external power supply to supply power to the battery;
   a first charging circuit configured to connect to the solar panel and having a first switching unit that has one end connected to the solar panel and another end connected to the battery;
   a second charging circuit configured to connect to the external power supply and having a second switching unit that has one end connected to the external power supply and another end connected to the battery; and
   a comparator having a first input end connected to the first charging circuit, a second input end connected to the second charging circuit, and an output end configured to output a comparison result, such that the first switching unit and the second switching unit are each responsive to the comparison result of the comparator to be in an on or off state.

2. The negative pressure suction-based fixing device according to claim 1, wherein the housing has a first end face with the suction and holding member mounted thereon and a second end face with the solar panel mounted thereon that are opposite and facing away from each other along an axial direction of the housing; a wall of the suction cavity is provided with a first through-hole, and the first end face of the housing is provided with a second through-hole, such that the suction cavity is in communication with the accommodating cavity via the first through-hole and the second through-hole.

3. The negative pressure suction-based fixing device according to claim 2, wherein the second end face is provided with a fitting recess in which the solar panel is mounted, with the light absorbing surface of the solar panel being flush with the second end face.

4. The negative pressure suction-based fixing device according to claim 2, wherein the solar panel is rotatably arranged on the second end face and is capable of being lifted or lowered relative to the second end face by rotation to adjust its angle.

5. The negative pressure suction-based fixing device according to claim 1, further comprising a magnetic member mounted on the housing and configured to magnetically attract a part to be secured.

6. The negative pressure suction-based fixing device according to claim 5, wherein the magnetic member is mounted on a side of the solar panel away from the housing, exposing at least a portion of the light absorbing surface.

7. The negative pressure suction-based fixing device according to claim 6, wherein the magnetic member is ring-shaped or arc-shaped.

8. The negative pressure suction-based fixing device according to claim 1, wherein
the first charging circuit further comprises a first protection unit configured to prevent reverse current and having one end connected to the first switching unit and another end connected to the battery; and
the second charging circuit further comprises a second protection unit configured to prevent reverse current and having one end connected to the second switching unit and another end connected to the battery.

9. The negative pressure suction-based fixing device according to claim 1, wherein the negative pressure creating assembly comprises:
a cylinder barrel having inside a receiving cavity in communication with the accommodating cavity;
a cylinder piston arranged in the receiving cavity; and
a driving element configured to drive the cylinder piston to reciprocate so as to generate negative pressure within the accommodating cavity.

10. The negative pressure suction-based fixing device according to claim 1, further comprising an activation assembly including:
a first movable part having one end arranged outside the accommodating cavity and another end arranged inside the accommodating cavity, and being capable of moving towards an interior of the accommodating cavity; and
a switch part configured to be actuated by movement of the first movable part towards the interior of the accommodating cavity so as to activate the negative pressure creating assembly.

11. The negative pressure suction-based fixing device according to claim 10, wherein
the suction cavity of the suction and holding member is provided with a suction port configured to abut against the suction surface;
a direction of the movement of the first movable part is parallel to an axial direction of the suction port; and
when the suction and holding member is suctioned onto the suction surface, the first movable part is capable of abutting against the suction surface, thereby suffering pressure from the suction surface to move towards the interior of the accommodating cavity.

12. The negative pressure suction-based fixing device according to claim 11, wherein the switch part is a bi-directional switch; and the first movable part is further capable of being moved towards an exterior of the accommodating cavity to actuate the bi-directional switch so as to activate the negative pressure creating assembly.

13. The negative pressure suction-based fixing device according to claim 1, further comprising an air inlet assembly configured to communicate the accommodating cavity with an exterior of the housing, allowing the suction and holding member to be detached from the suction surface.

14. The negative pressure suction-based fixing device according to claim 13, wherein the air inlet assembly includes a second movable part having one end disposed outside the housing and another end disposed inside the housing, capable of opening an air channel between the accommodating cavity and the exterior of the housing when subjected to pressure.

* * * * *